Figure 1:
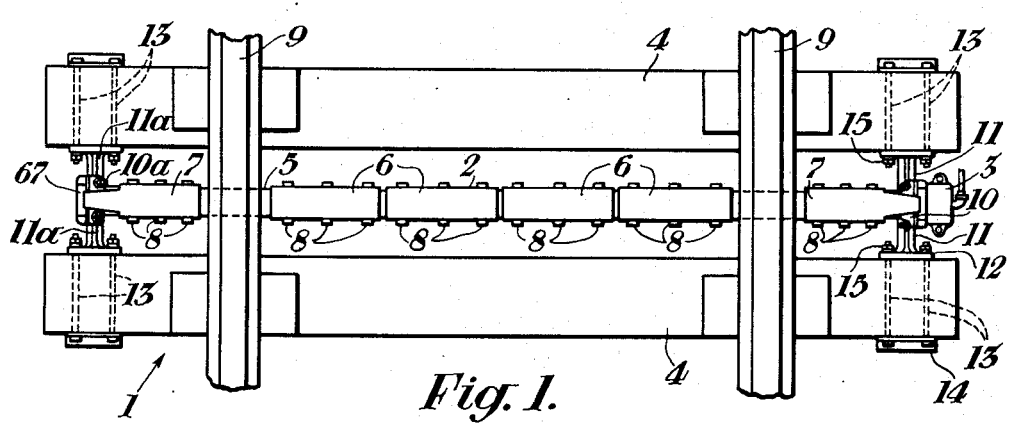

INVENTORS.
Kenneth J. J. McGowan
and Robert A. Woods
BY
THEIR ATTORNEY

Dec. 15, 1953  K. J. J. McGOWAN ET AL  2,662,973
SELF-RESTORING DRAGGING EQUIPMENT DETECTOR
Filed Feb. 24, 1950  6 Sheets-Sheet 2

INVENTORS.
Kenneth J. J. McGowan
and Robert A. Woods
BY

THEIR ATTORNEY

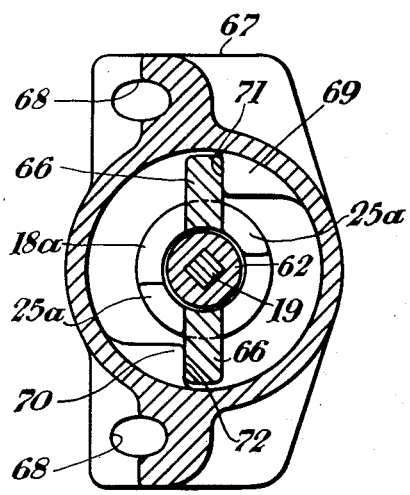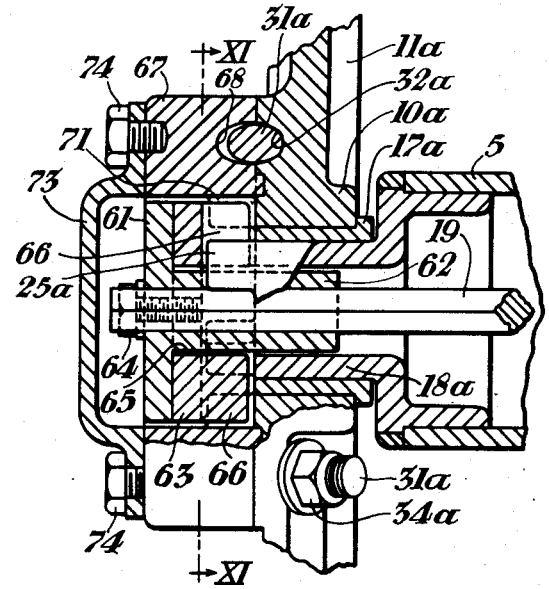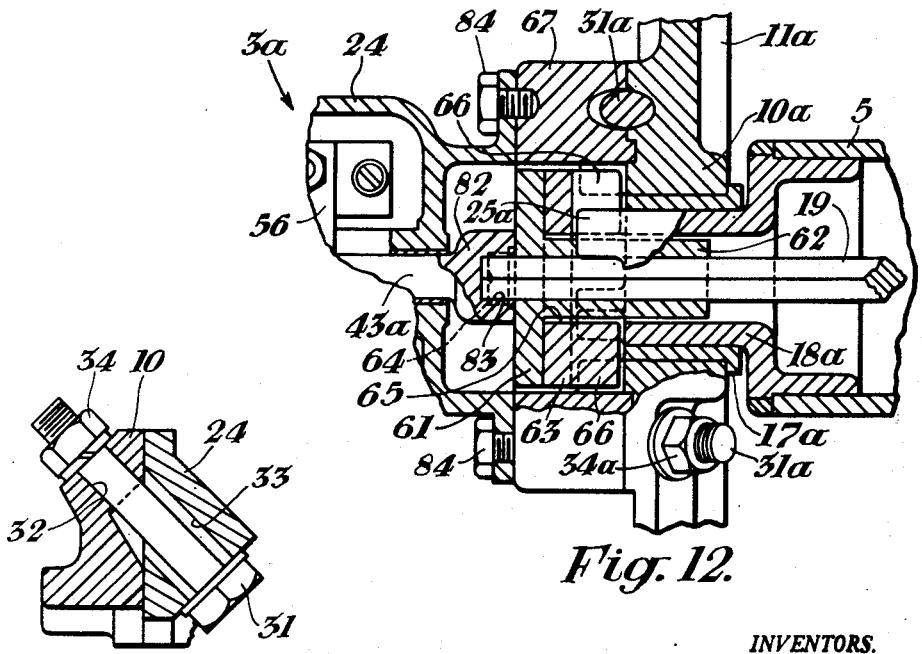

INVENTORS.
Kenneth J. J. McGowan
and Robert A. Woods
BY
THEIR ATTORNEY

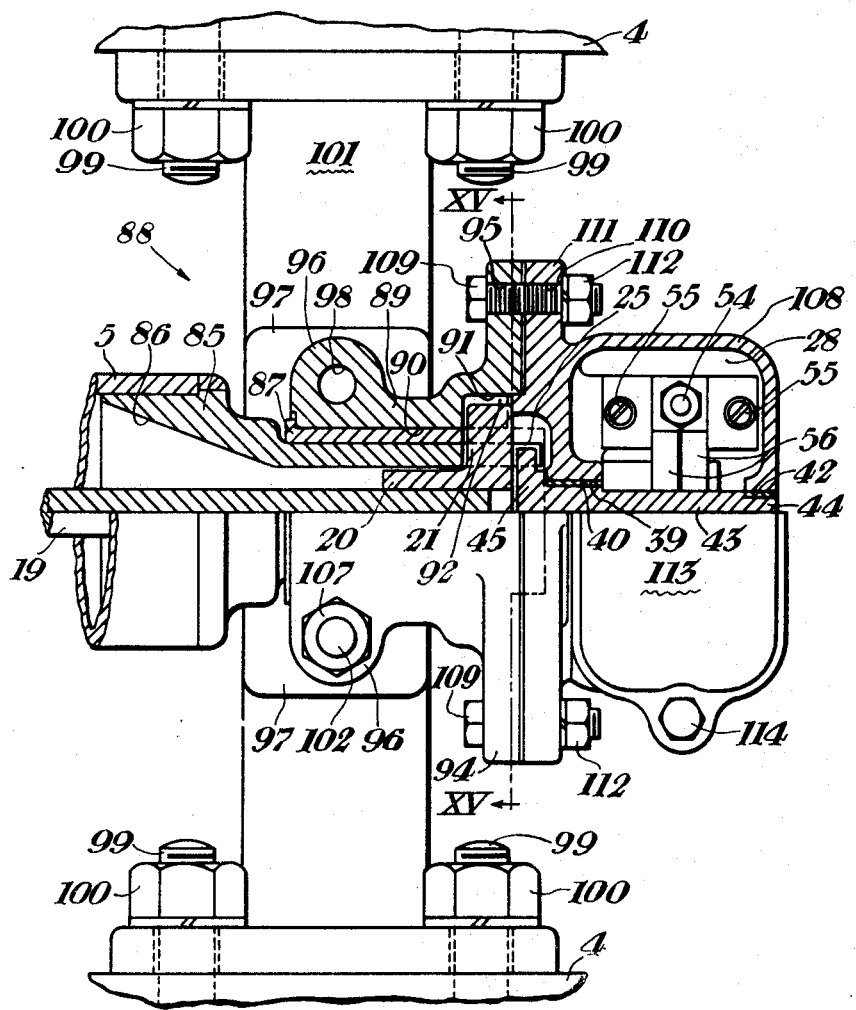
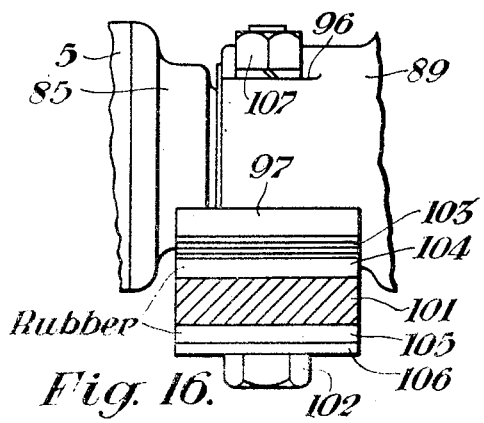
Fig. 14.
Fig. 16.

Dec. 15, 1953     K. J. J. McGOWAN ET AL     2,662,973
SELF-RESTORING DRAGGING EQUIPMENT DETECTOR
Filed Feb. 24, 1950     6 Sheets—Sheet 6

INVENTORS.
Kenneth J. J. McGowan
and Robert A. Woods
BY
THEIR ATTORNEY

Patented Dec. 15, 1953

2,662,973

UNITED STATES PATENT OFFICE 2,662,973

SELF-RESTORING DRAGGING EQUIPMENT DETECTOR

Kenneth J. J. McGowan, Pittsburgh, and Robert A. Woods, Verona, Pa., assignors to Westinghouse Air Brake Company, a corporation of Pennsylvania Application February 24, 1950, Serial No. 146,098

25 Claims. (Cl. 246—246)

Our invention relates to dragging equipment detectors, and more particularly to self-restoring dragging equipment detectors adapted to be located along a railway track for detecting objects dragging or hanging from a passing vehicle.

Dragging equipment detectors are used principally ahead of locations such as switches, crossovers, tunnels and bridges where damage and derailment may occur due to objects dragging from a passing vehicle, and ahead of car inspection pits in classification yards to operate signals within the inspection pits to forewarn the inspectors of an approaching car dragging a piece of equipment. Such detectors normally comprise a shaft pivotally mounted below the rails and carrying upstanding detector plates spaced apart along such shaft between and exteriorly adjacent the railway tracks. The upstanding plates are deflected when struck by a dragging object to rotate the detector plate shaft. A circuit controller usually integrated with the block signal system is operated by the rotation of the detector plate shaft to provide a warning signal ahead of the train so that the engineer may bring his train to a stop before the dangerous location is reached.

In previous dragging equipment detectors when of the self-restoring type, the shafts carrying the detector plates were coupled by way of a crank arm to a circuit controller, coil springs being provided to return the detector plates to their normal upright position; or the detector plate shafts were coupled to spring biased cams of a circuit controller, the camming action due to the springs restoring the detector plates to their upright position. In both types of detectors, the circuit controllers and the spring biased restorative means required casings and enclosures of considerable proportions to protect such units from the elements.

Installations of prior type dragging equipment detectors necessitated considerable work and effort in placing the equipment into operation and because of their space requirements such installations have proven objectionable in some instances. In placing such detectors into operation, it was necessary to remove several of the regular railway ties and replace them with extra length ties to accommodate the equipment. The detector plate shafts, bearings and crank arms required supporting structures and enclosures which were mounted on the top and near the ends of the extra length ties. The extra length ties and the raised enclosures thereon led to difficulties in cleaning the ballast by the prevalent mechanical methods employed today. In one type of mechanical ballast cleaner an auxiliary track is set up for guiding the fingers or rakes used in handling the ballast. The track could not be laid over the raised enclosures or their connections, nor could the fingers scoop up the ballast between the newly laid ties because of their extra length. Consequently, those sections of the track occupied by the dragging equipment detector were passed over by the mechanical ballast cleaner and the ballast subsequently cleaned and handled manually.

It is therefore an object of our present invention to provide a compact and rugged dragging equipment detector of the self-restoring type in which the prevalent spring biasing means are eliminated and in which the restorative biasing means forms a part of the detector plate shaft assembly.

Another object of the present invention is to provide a compact dragging equipment detector which may be installed between two existing railway ties, the supporting components and circuit controller of the detector being well below the top surfaces of the two supporting ties; the supporting components with the circuit controller being interchangeable to permit installation of these elements on either side of the railway track.

Still another object of our invention is to provide a self-restoring dragging equipment detector of the character indicated in which the circuit controller of the unit may be selectively actuated in accordance with the direction of the passing vehicle to operate the proper advance signal of the block signal system in which it is integrated.

A further object of the present invention is to provide a resilient mounting for a dragging equipment detector of the character indicated, the movement of the rails due to a passing vehicle and the shock of operation being absorbed by the mounting so that the parts of the detector will remain in alignment and in proper operating condition.

Still another object of the invention is to provide novel take-up means for the dragging equipment detector by which any lost motion between the elements is eliminated.

According to our invention the detector plate shaft carrying the detector plates is pivotally mounted in the roadway in a position wherein the detector plates will be struck by any dragging equipment. The detector plate shaft is hollow, and extending through said shaft concentric therewith is a torque rod, the ends of which extend slightly beyond the ends of the detector plate shaft. Fixed to each of the ends of the torque rod are torque rod arms adapted to cooperate with two diametrically opposed and extending lugs on the detector plate shaft. The torque arm also cooperates with two fixed stops provided in a circuit controller housing and in an end housing fixed respectively to the bearing supports for the detector plate shaft; the bearing supports being fixed between the opposing faces of two existing ties. One end of the shaft is provided with a circuit controller coupled to the detector plate shaft, while the other end of the shaft is provided with a torque adjuster to provide an initial tension for the torque rod, thereby loading the same so that accidental or malicious tipping of the detector plates will not occur. As will hereinafter be apparent, a circuit controller may be provided for each end of the detector plate shaft so that selective operation of the circuit controllers may be had to provide a warning signal ahead of a train which may be traveling over the detector in either direction.

Any equipment dragging from a passing vehicle will strike the detector plates and deflect them in the direction of travel. The rotation of the detector plate shaft will, through its connection by way of its extending lugs and the torque arm fixed to the torque rod, tend to twist the torque rod. The extending lugs of the detector plate shaft and the fixed stops in the circuit controller and end housings are so placed that, depending upon the direction of rotation of the detector plate shaft, one end of the torque rod will be held by the torque arm and fixed stops on that end of the shaft, while the other end of the torque rod is turned by the cooperation of the torque rod and extended lugs of the shaft on that end of the shaft. The circuit controller will be operated through its coupling to the detector plate shaft to set the warning signal ahead of the train.

Due to the tensioning of the torque rod by the twisting action of the detector plate shaft in rotating, the detector plates are returned to their upright position as soon as the dragging object passes on with the train. The dragging equipment detector is thus in a position where it will again respond to any dragging objects.

The novel dragging equipment detector thus far described is further characterized by a unique means for eliminating any lost motion in the coupling between the detector plate shaft and the circuit controller. These means take the form of an annular groove provided in the bearing support and a cooperating annular ridge on the circuit controller housing. The bearing support is provided with two bolt openings while the circuit controller housing is provided with two elongated bolt openings, both sets of bolt openings being angularly disposed with respect to the axis of rotation of the detector plate shaft supported in the bearing support. The bearing support being fixed to the ties, the circuit controller housing may be turned slightly to align the fixed stops in the housing with the torque arm fixed to the end of the torque rod so that any lost motion of the parts is eliminated.

In another embodiment of our invention hereinafter more fully described, we provide a dragging equipment detector of the general character described in which the bearing supports for the detector plate shaft are resiliently mounted between two existing railway ties. The bearing supports of this embodiment are altered slightly to include the stops for the torque rod lugs. Straps fixed between the opposing faces of two railway ties support the bearing supports, the bearing supports being mounted on rubber pads and shims, and bolted to the supporting straps. The shims are provided in the resilient mounting to align the stops of the bearing supports with the torque rod lugs to eliminate lost motion between the parts.

Other objects and characteristic features of our invention will become apparent as the description proceeds.

We shall describe several forms of dragging equipment detectors embodying our invention, and shall then point out the novel features thereof in claims.

Figure 2:
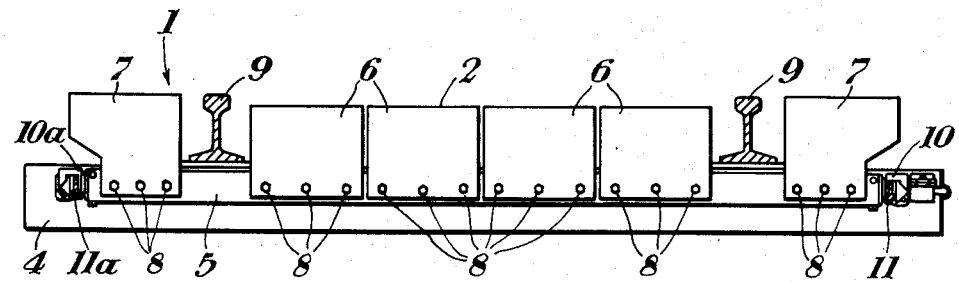
Figures 3, 7, 8:
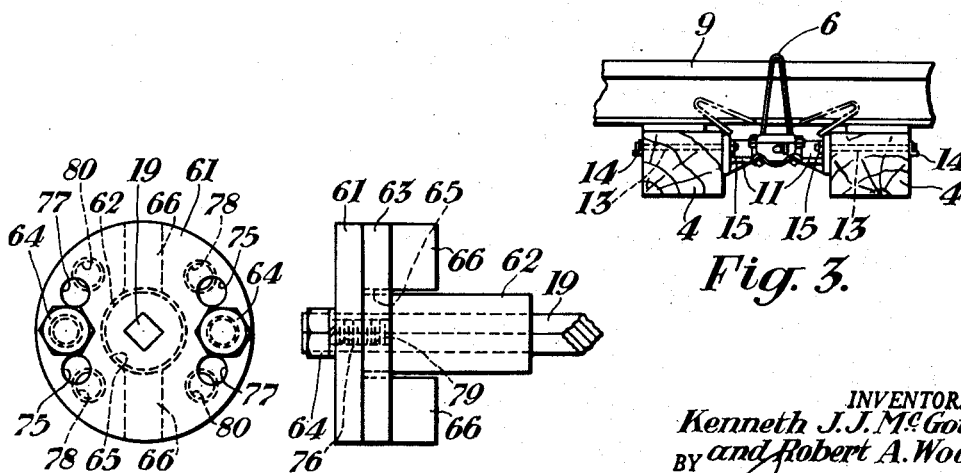
Figure 4:
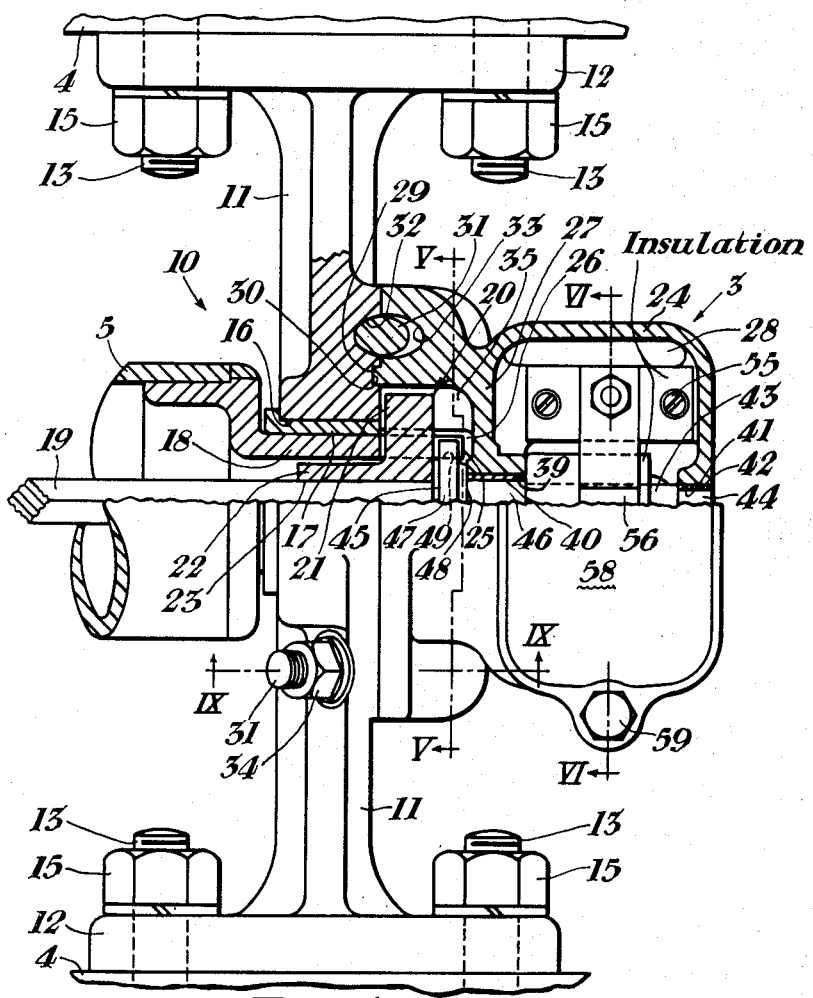
Figure 5:
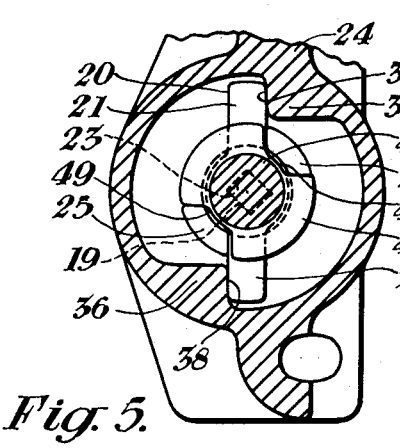
Figure 6:
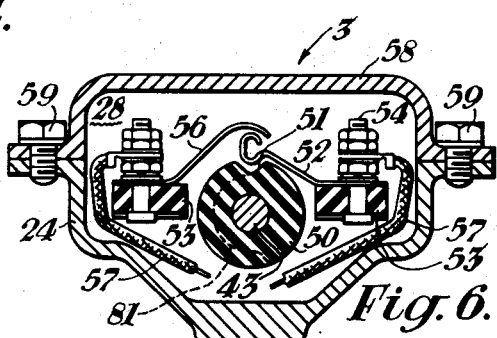
Figure 13:
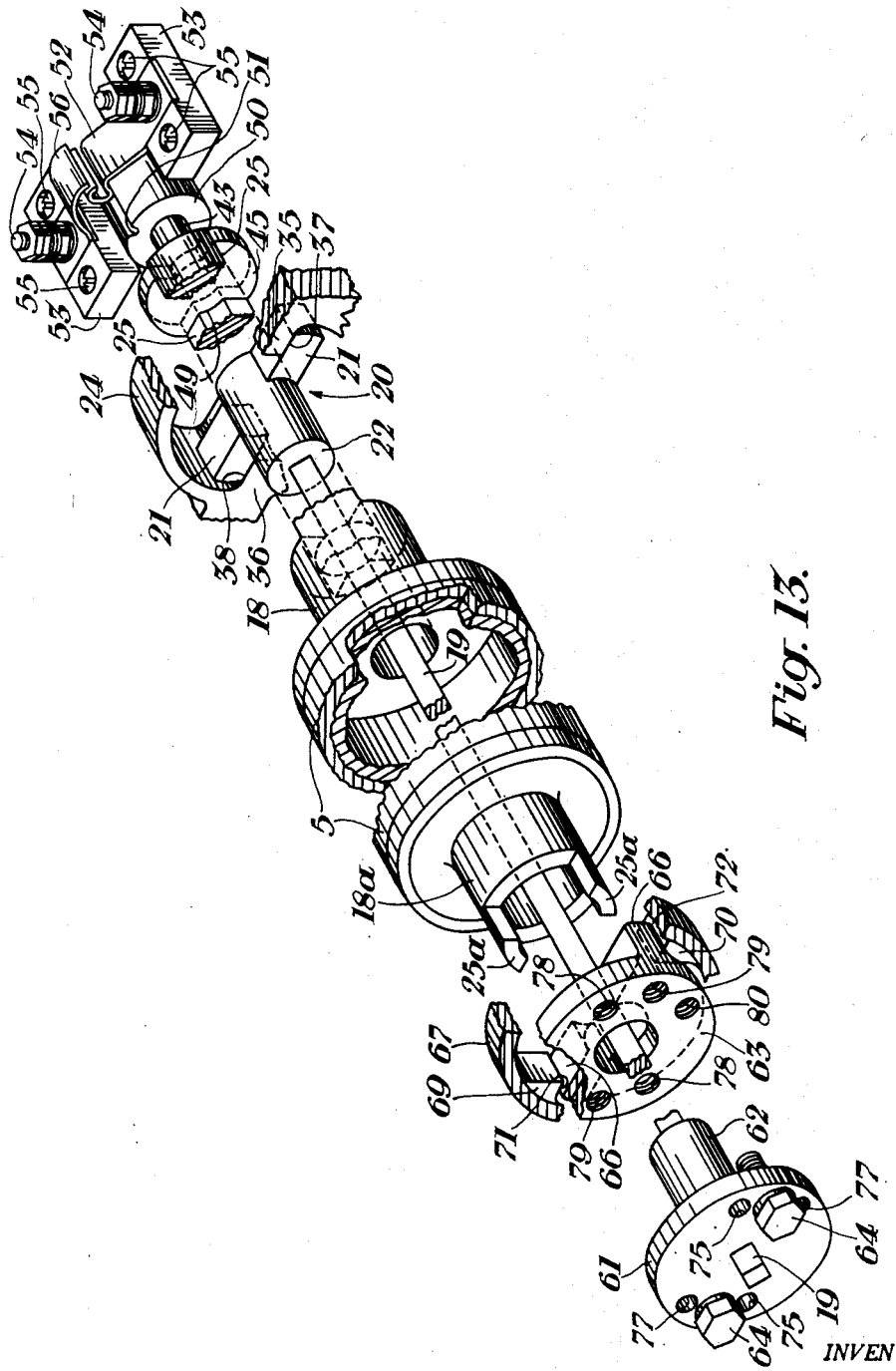
Figure 17:
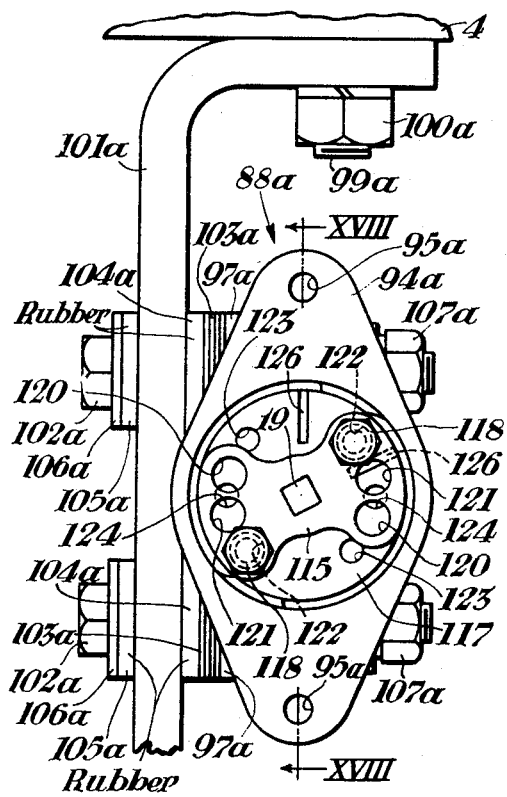
Figure 15:
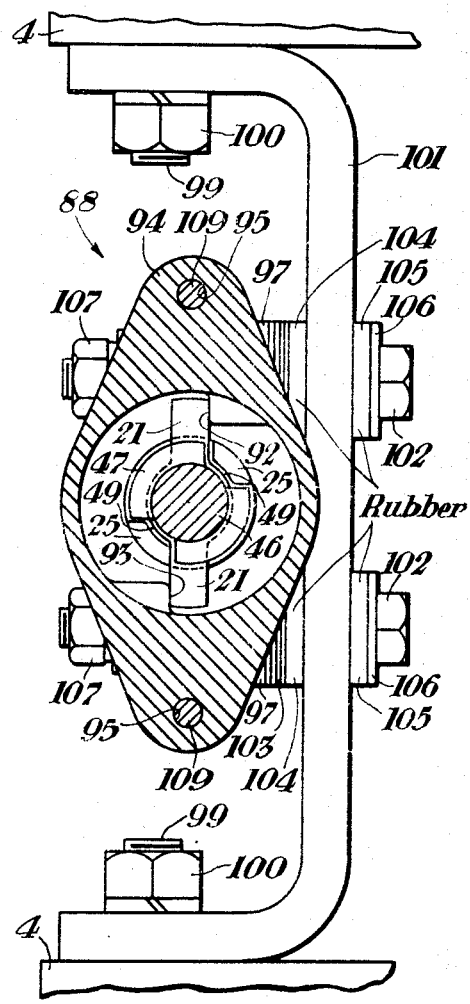
Figure 18:
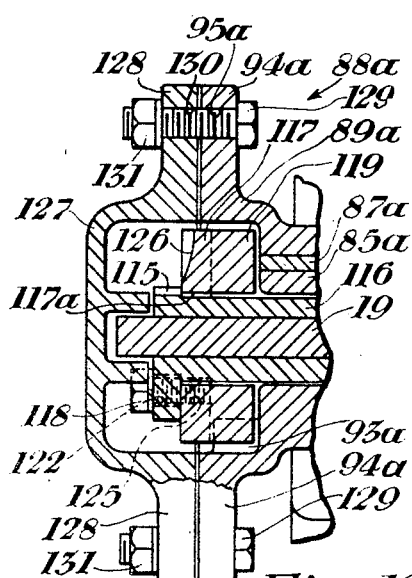

In the accompanying drawings, Fig. 1 is a top plan view showing a dragging equipment detector embodying our invention applied to a railway track. Fig. 2 is an elevational view of the dragging equipment detector shown in Fig. 1. Fig. 3 is an end elevational view of the detector shown in Fig. 1. Fig. 4 is an enlarged plan view of the support for the detector plate shaft and the circuit controller, portions thereof being in section to illustrate the coupling of the detector plate shaft and the circuit controller. Fig. 5 is a sectional view taken along the line V—V of Fig. 4 showing details of the torque arm and detector plate shaft. Fig. 6 is a sectional view taken along the line VI—VI of Fig. 4 showing details of the circuit controller. Fig. 7 is an end view of the torque adjuster as viewed from the left side of Fig. 1. Fig. 8 is a side elevational view of the torque adjuster shown in Fig. 7. Fig. 9 is a fragmentary sectional view with portions in elevation taken substantially along the line IX—IX of Fig. 4. Fig. 10 is an enlarged plan view of the torque adjuster end of the detector plate shaft, portions thereof being cut away and in section. Fig. 11 is a sectional view taken along the line XI—XI of Fig. 10. Fig. 12 is an enlarged plan view with portions cut away and in section, similar to Fig. 4, to illustrate the coupling of the circuit controller shaft with the torque rod. Fig. 13 is an exploded view in isometric projection of the dragging equipment detector illustrating the cooperation of the various parts. Fig. 14 is an enlarged plan view of another embodiment of our invention illustrating a support for the detector plate shaft and circuit controller, portions thereof being in section to illustrate the coupling of the detector plate shaft to the circuit controller, and to illustrate the fixed stops for the torque rod lugs. Fig. 15 is a cross-sectional view taken along the line XV—XV of Fig. 14. Fig. 16 is a fragmentary side elevational view of the detector plate shaft bearing support showing the details of the resilient mounting. Fig. 17 is a plan view of the torque adjusting end of the detector plate shaft, portions of which are in section; while Fig. 18 is a cross-sectional view taken along the line XVIII—XVIII of Fig. 17.

Similar reference characters refer to similar parts in each of the several views.

Referring now in detail to Figs. 1, 2 and 3, the dragging equipment detector embodying our invention is designated by the numeral 1 and comprises a detector member 2 operatively connected with a circuit controller 3. The detector member 2 is disposed between two existing ties 4 of a stretch of railway track and comprises a tubular shaft 5 and a plurality of inverted V-shaped detector plates 6 and 7 fixed to said shaft as by bolts 8. The detector plate shaft 5 extends transversely of the railway track beneath the track rails 9. The outer detector plates 7 are cut away at the lower outer edges thereof to accommodate the relatively short shaft 5, the upper edges of these outer plates however affording the necessary protection for any outboard dragging objects.

The detector plate shaft 5 is supported at both ends by bearing supports 10 and 10a fixed to the ties 4. The supports are identical, and the description of the support 10 will suffice for the support 10a, the corresponding elements of the support 10a being designated in the drawings by the same reference character followed by the subscript a. The bearing support 10 has integral therewith two oppositely extending arms 11 terminating in end flanges 12. The bearing support is fixed between the two existing ties 4 and to the opposing faces thereof by means of bolts 13 passing through suitable openings in the flanges 12 and in the ties; reinforcing plates 14 and nuts 15 completing the assembly of the support to the ties. It will be noted in Figs. 2 and 3 that no part of the bearing support extends above the top surface of the railway ties.

The bearing support 10 is provided with a centrally disposed through opening 16 (Fig. 4) having therein an annular bearing 17. Integral with the ends of the detector plate shaft 5 are reduced tubular sections, or bearing shafts 18 and 18a received within the bearings 17 and 17a of the supports 10 and 10a, respectively.

The detector plates are maintained in an upright position in the manner to be hereinafter described, so that any object being dragged by a passing train will deflect the plates, thereby rotating the shaft 5. As illustrated in Fig. 3 of the drawings, the ties to which the bearing supports are fixed will serve as the limit stops for the deflected plates, the movement of the detector plates being limited to approximately 63 degrees on either side of the vertical position.

Means are provided for maintaining the detector plates in an upright or normal position and for biasing said plates to their normal position after being struck and deflected by a dragging object.

To this end, there is provided a torque rod 19, preferably made of spring steel, within the detector plate shaft 5, the ends of said rod extending out and beyond the ends of the shaft 5 and the bearing shafts 18 and 18a. The torque rod is illustrated as having a square cross-section, but it will be appreciated as the description continues that other forms of rods or bars may readily be used. The end of the torque rod cooperating with the circuit controller 3 is provided with a torque arm 20 having two radially extending lugs 21 integral with the hub 22 of the torque arm. The torque arm 20 is formed with a square opening 23 which receives the end of the torque rod 19. The hub 22 of the torque arm is received within the bearing shaft 18, the parts being so assembled that relative rotation is obtained between the torque arm 20 and the bearing shaft 18. The extending lugs 21 of the torque arm extend beyond the bearing support 10 and are adapted to be received within the housing 24 of the circuit controller 3.

The bearing shaft 18 is formed with two diametrically opposite extensions or lugs 25 (Figs. 5 and 13) which also extend beyond the bearing support into the circuit controller housing 24. The bearing shaft lugs are approximately 63 degrees in circumferential extent and are adapted to coact with the torque arm in restoring the detector plates to their upright position in a manner hereinafter more fully described.

The circuit controller housing 24 comprises an annular compartment 26 separated by a wall 27 from a second annular compartment 28, the open ends of the two compartments being approximately at right angles to each other. The end face of the compartment 26 is formed with an annular ridge 29 adapted to be received within an annular groove 30 formed in the face of the bearing support 10 to form a tongue and groove connection between the bearing support and the circuit controller housing. The housing 24 is fixed to the bearing support by means of two bolts 31 passing through openings 32 in the bearing support and through the enlarged openings or slots 33 in the housing 24, and the nuts 34 (Fig. 9). For purposes hereinafter appearing, the openings 32 and 33 are angularly disposed with respect to the face of the bearing support. The interior of the compartment 26 is formed with two bosses 35 and 36 on opposite sides thereof, two opposite faces 37 and 38 of the bosses serving as stops for the torque arm 20 as illustrated in Fig. 5.

The wall 27 of the circuit controller housing is formed with a through opening 39 having a bearing 40 disposed therein. The opposite side of the compartment 28 is formed with an aligned opening 41 having a bearing 42 fixed therein. Journaled in the bearings 40 and 42 is a circuit controller shaft 43 having a reduced end portion 44 supported by the bearing 42, the other end of the shaft being enlarged to form a torque disc 45 and a hub 46, the hub 46 being supported in the bearing 40. The torque disc 45 is formed with a shoulder 48 which abuts the bearing 40 to reduce end play of the shaft 43. Two diametrically opposite peripheral recesses 49 are formed in the disc 45 which are adapted to receive the extending lugs 25 on the bearing shaft 18 (Figs. 4, 5 and 13). The two recesses 49 of the torque disc 45 are arcuate when viewed head on, being approximately 63 degrees in extent, the circumferential length of the bearing shaft lugs 25.

Fixed to the circuit controller shaft 43 is a contact cam 50 of insulation material formed with a peripheral notch 51. Cooperating with said cam and normally engaging the notch 51 is a spring contact finger 52 fixed to an insulating terminal strip 53 as by a terminal post 54, the terminal strip being suitably mounted within the compartment 28 as by screws 55. Cooperating with the spring contact finger 52 is a contact finger 56 fixed to a second insulating terminal strip 53 on the other side of the shaft 43 and adapted to be engaged by the spring contact finger 52 upon rotation of the contact cam 50. The two contacts 52 and 56 are connected by the leads 57 into the signal circuit. A cover 58 fixed over the compartment 28 as by bolts 59 seals the compartment against the elements.

It will be understood that although the contacts 52 and 56 are illustrated as being normally open, the contacts may be normally closed, and opened upon rotation of the contact cam.

The end of the detector plate shaft 5 opposite the circuit controller 3, hereinafter referred to as the torque adjuster end, is provided with a bearing shaft 18a received within the bearing 17a of the bearing support 10a (Fig. 10). Fitted over this end of the torque rod 19 is a torque adjuster plate 61 having an extended hub 62 received within the bearing shaft 18a (see Figs. 7 and 8). A torque arm or disc 63 is fixed to said torque adjuster plate as by bolts 64, the torque disc having a centrally disposed opening 65 for receiving the hub 62 of said plate. The torque disc 63 is provided with two radially extending lugs 66 similar to the lugs 21 of the torque arm 20 and disposed in a plane parallel to the lugs 21. The lugs 66 are adapted to coact with the extended lugs 25a on the bearing shaft 18a.

An annular casting 67 is fixed to the bearing support 10a by the bolts 31a passing through the openings 32a of said bearing support and through the enlarged openings 68 in the casting. Two bosses 69 and 70 (see Fig. 11) are formed within the annular casting to provide stops 71 and 72 for the lugs 66 of the torque disc 64. A cover casting 73 fixed to the annular casting 67 by bolts 74 completes the torque adjuster end assembly.

In installing the dragging equipment detector described, the two bearing supports 10 and 10a are fixed to the rail ties 4 in the manner described by bolts 13 and nuts 15, the arms 11, 11a of the supports being disposed in approximately the same plane. An initial torque or bias is provided for the torque rod 19 by the torque adjuster plate 61 to maintain the detector plates 6 and 7 in an upright position and to provide sufficient bias to prevent accidental or malicious deflection of the plates.

It will be noted in Figs. 7 and 8, that the torque adjuster plate 61 fixed to the end of the torque rod is provided with three pairs of openings 75, 76 and 77 at spaced intervals, while the torque disc 63 is formed with three pairs of threaded openings 78, 79 and 80 spaced at greater intervals for receiving the bolts 64. To apply an initial torque to the torque rod, the bolts 64 are removed from the torque adjuster plate and the torque disc. A suitable wrench is then applied to the extending end of the torque rod and the rod torsionally deflected a desired degree. If the torque rod is rotated in a counterclockwise direction (Figs. 11 and 13) and the torque disc 63 restrained from rotating, the circuit controller end of the rod will be held against rotation by the abutment of the lugs 21 against the stops 37 and 38 (Fig. 13). Rotation of the torque rod 19 in a counterclockwise direction will therefore apply a torque to the rod, the degree of torque being varied by the fastening of the plate 61 to the disc 63 by the bolts 64. It will be noted that the spacings of the openings 65, 66 and 67 of the plate 61 are less than the spacings of the openings 68, 69 and 70 in the disc 63. Nine possible ways of fastening the plate 61 to the disc 63 are provided by the six pairs of openings. By a proper selection of the pairs of openings in each of the elements for inserting the bolts 64, any desired initial bias of the torque rod 19 may be obtained. We have found an initial torque, requiring a force of at least 100 pounds applied to the upper end of the detector plates to deflect the same, satisfactory in preventing accidental actuation of the detector.

After the equipment is installed and an initial bias applied to the torque rod, the detector plates 6 and 7 will be maintained in an upright position by the bias of the torque rod, the upright position being determined by the plane of the stops 37, 38 and 71, 72. A piece of dragging equipment in striking any of the plates will deflect the plates causing the detector plate shaft 5 to rotate.

If we assume a train is moving over the section of track occupied by the detector, in the direction from left to right in Fig. 13, any dragging object will cause the detector plate shaft 5 to rotate in a clockwise direction. The lugs 25 on the ends of the bearing shaft 18 will rotate the torque arm 20 in a clockwise direction due to the engagement of the lugs 25 with the lugs 21 on said arm. On the other hand, the torque adjuster end of the torque rod is held against rotation by the abutment of the lugs 66 on the stops 71 and 72. The rotation of the torque arm 20 will thus increase the bias of the torque rod 19, so that the detector plates 6 and 7 will again be returned to their upright position after the dragging object is carried beyond the detector mechanism. The rotation of the detector shaft 5 will rotate the cam shaft 43 by way of the coupling formed by the lugs 25 on the bearing shaft 18 and the recesses 49 in the torque disc 45 of the circuit controller. The circuit controller contact cam 50 will thus be rotated to lift the spring contact 52 into engagement with the contact 56 to set up a restrictive signal ahead of the train. The return of the detector plate shaft 5 will rotate the cam 50 to its initial position to open the contacts 52, 56.

Should a train pass over the detector in a direction from right to left in Fig. 13 and a dragging object strike the detector plates 6 and 7, the shaft 5 will be rotated in a counterclockwise direction. The lugs 25a on the bearing shaft 18a will rotate the lugs 66, disc 63 and therefore plate 61 in a counterclockwise direction to apply a torque to the rod 19. The circuit controller end of the torque rod being held by the engagement of the lugs 21 and the stops 37 and 38, the bias of the torque rod is again increased by the deflection of the detector plates 6 and 7 for returning the detector plates to their initial position. The rotation of the shaft 5 will rotate the bearing shaft 18 in a counterclockwise direction, the lugs 25 on the bearing shaft in the recesses 49 of the disc 45 turning the circuit controller shaft 43 in a counterclockwise direction. The contacts 52 and 56 will again be operated in the manner described to initiate the warning signal for the train.

In placing the dragging equipment detector described into operation, difficulty due to tie construction may be encountered which prevents the installation of the bearing supports 10 and 10a in alignment. In such instances, the one bearing support may be mounted with the extending arms 11 tilted with respect to the horizontal, while the other bearing support may be mounted with the extending arms horizontal. In fixing the circuit controller casting 24 and the annular casting 67 to the bearing supports, it will be found that the stops 37, 38 will not align with the stops 71, 72. There would thus be lost motion between the bearing shaft lugs 25, 25a, the torque arm lugs 21, 66 and the circuit controller torque disc recesses 49.

To eliminate the lost motion between the parts, the bearing support 10 was provided with the annular groove 30 and the circuit controller casting 24 with the annular ridge 29, together with the bolt holes 32 and elongated openings 33, respectively. When the parts are misaligned, one of the bolts 31 and nuts 34 may be loosened and the other bolt and nut tightened to rotate the casting 24 with respect to the bearing support 10 to align the stops 37, 38 and the lugs 21, or as in the case of the torque adjustment end, to align the stops 71, 72 and the lugs 66. As previously described, the openings 32 and 33 are angularly disposed with respect to the axis of rotation of the shaft 43 and the torque arm 20. Thus in loosening one of the bolts 31 and taking up on the other bolt a camming action will take place between the end surfaces of the bearing support 10 and the casting 24, tending to rotate the casting 24 with respect to the bearing support.

While we have illustrated and described a dragging equipment detector which will operate the signal ahead of a train passing in either direction over the section occupied by the detector, the detector may be readily adapted to provide selective signals in accordance wth the direction of the passing train.

To this end the contour of the contact cam 50 may be altered to provide a peripheral camming surface 81 indicated by the dashed line of Fig. 6, extending a little more than 180 degrees of the cam periphery so that counterclockwise rotation only will cause the contacts 52, 56 to close. A circuit controller fixed to the bearng support 10a having its shaft coupled to the detector plate shaft 5 and provided with a contact cam 50 formed with a cam surface 81 would provide a selective signal ahead of a train passing in a direction to rotate the detector plates clockwise, as viewed from the right in Fig. 1.

While we have illustrated and described the circuit controller shaft 43 as being coupled to the detector plate shaft 5 in providing a signal ahead of a train passing over the detector in either direction, or providing a selective signal ahead of a train passing over the detector in a stated direction, it will be appreciated that the torque rod 19 could be coupled to the circuit controller shaft to provide a signal ahead of a train passing over the detector in a given direction. If we assume a train dragging an object, passes over the section occupied by the detector from left to right in Fig. 13, the detector plate shaft 5 will be rotated in a clockwise direction. The extending lugs 25 on the bearing shaft 18 will carry the torque arm 20 in the same direction. The torque arm being fixed to the torque rod will rotate the rod in a clockwise direction while the torque adjusting end of the rod will be held stationary by the abutment of the lugs 66 against the stops 71, 72. If the circuit controller shaft is coupled directly to the circuit controller end of the torque rod, the contact cam 50 will be rotated clockwise to close the contacts 52, 56. If we assume a train passing in an opposite direction, the detector plate shaft will be rotated in a counterclockwise direction. The torque adjusting end of the rod 19 will be rotated in a counterclockwise direction by the cooperation of the bearing shaft lugs 25a, torque disc lugs 66 and the plate 61. The circuit controller end will be held stationary by the lugs 21 of the torque arm abutting the stops 37, 38. Directive signals may thus be obtained by coupling the circuit control shaft to the end of the torque rod 19.

In Fig. 12 we have illustrated the circuit controller shaft 43a of a circuit controller 3a coupled to an end of the torque rod by way of a connector 82 formed with a recess 83 for receiving the end of the torque rod 19. By way of example, the torque rod connection is shown connected at the torque adjusting end of the torque rod, a similar connection being readily made at the other end of the rod with the provision of the connector 82. In the case of the connection being made at the torque adjusting end of the rod, the circuit controller casting 24 is altered slightly to accommodate torque adjusting plate 61 and the torque disc 63, the casting 24 being fixed to the annular casting 67 as by the bolts 84.

Referring now to Figs. 14 through 18 of the drawings in which another embodiment of our invention is illustrated, the detector plate shaft 5 has fixed to the circuit controller end thereof (Figs. 14 and 15) a bearing shaft 85, the interior surface 86 of the bearing shaft being conical to facilitate the insertion of the torque rod 19 through the detector plate shaft assembly. The bearing shaft 85 is journaled in a bearing 87 of a bearing support 88. The torque adjusting end of the detector plate shaft (Figs. 17 and 18) is also provided with a bearing shaft 85a supported in a bearing support 88a, the bearing supports 88 and 88a being identical and interchangeable as will hereinafter appear.

The bearing support 88 comprises a casting 89 having an annular opening 90 to receive the bearing 87. The opening 90 extends rearwardly and registers with a larger and concentric opening 91 in the rear of the casting. Within the larger opening 91 and integral with the casting 89 are two fixed stops 92 and 93 similar to the fixed stops 37 and 38 previously described. The rear of the casting 89 is formed with a flange 94 having two bolt openings 95 drilled through the two ends thereof. The upper surface of the forward end of the casting is formed with two outwardly extending bosses 96, while the lower portion of the forward end terminates in two outwardly extending feet or pads 97. A bolt opening 98 is drilled through the ends of the bosses, the casting 89 and the pads 97 for fastening the bearing support between the railway ties 4.

Fixed to the opposing faces of the two railway ties 4 as by bolts 99 and nuts 100, is a U-shaped strap 101. The bearing support 88 is fixed to the strap 101 by means of upwardly extending bolts 102. The pads 97 of the bearing support casting 89 rest upon a plurality of shims 103, the shims resting upon resilient pads 104, preferably of rubber, on the top surface of the strap 101 (Fig. 16). A second resilient pad 105 is provided for each of the pads 97 of the casting which is placed below the strap 101 and held in place by a washer 106; the bolts 102 passing through the washers 106, the pads 105 and 104, the shims 103, and through the bolt openings 98; the nuts 107 on the ends of the bolts fastening the bearing support 88 to the strap 101. It will be noted that the bearing supports 88, 88a are well below the top surface of the ties 4 (Figs. 15, 17).

A circuit controller casting 108 is fixed to the bearing support 88 by bolts 109 passing through the bolt openings 95 in the flange 94 and through bolt openings 110 in a flange 111 provided for the casting 108; a nut 112 fastening the two elements together. The circuit controller elements are the same as those illustrated and described in connection with Figs. 4 and 6, with the exception of the contacts 52 and 56, these contacts being illustrated in Fig. 14 as being double contacts (only contact 56 being shown). The same reference characters have therefore been applied to the same elements within the circuit controller casting 108. A cover plate 113 fixed to the casting 108 by a bolt 114 completes the circuit controller assembly.

In Figs. 14 and 15 the same reference characters have been applied to the various elements illustrated in the foregoing views and previously described. The cooperation of the elements is the same as that hereinbefore described, the torque arm lugs 21 being rotated by the lugs 25 on the bearing shaft 85 when the detector plate shaft 5 is rotated in a counterclockwise direction as seen in Fig. 15; the torque arm lugs 21 being held by the stops 92 and 93 of the bearing support when the torque rod 19 is torsionally deflected in a clockwise direction. The extending lugs 25 of the bearing shaft 85 also cooperate with the recesses 49 of the torque disc 45 on the end of the circuit controller shaft 43, the rotation of the circuit controller shaft operating the double contacts 52, 56.

The torque adjusting end of the detector plate shaft assembly (Figs. 17 and 18) is journaled in the bearing support 88a, the elements thereof being identical with those of the bearing support 88 and have the same reference characters applied thereto followed by the distinguishing subscript a. Fixed over the end of the torque adjusting end of the torque rod 19 is a torque adjusting member 115 having an inwardly extending hub 116 rotatable within the bearing shaft 85a, the hub and adjusting member having a square through opening for receiving the end of the torque rod 19. A torque disc 117 formed with an opening 117a for receiving the hub 116 is fixed to the torque adjuster member 115 as by bolts 118. The torque disc 117 is similar to the torque disc 63 previously described, being provided with radially extending lugs 119 adapted to coact with the fixed stops 92a, 93a of the bearing support 88a. The torque adjusting member 115 is provided with three pairs of openings 120, 121 and 122 at spaced intervals, while the torque disc 117 is provided with three pairs of threaded openings 123, 124 and 125 spaced at greater intervals for receiving the bolts 118. The spaced openings 120—125 are similar to the openings 75—80 provided in the plate 61 and disc 63 previously described, and perform the same function in initially stressing the torque rod 19. Slots 126 cut into the outer face of the torque disc 117 are provided for the insertion of a tool, such as a screw driver, to hold the torque disc while the torsional deflection of the bar is adjusted.

A cover casting 127 formed with a flange 128 is fastened to the bearing support 88a by the bolts 129 passing through the openings 95a in the support and openings 130 in the flange, and the nuts 131 to protect the parts from the elements.

The dragging equipment detector illustrated in Figs. 14-18 will operate in the same manner as hereinbefore described in connection with the preceding views. The modifications previously set forth in connection with the coupling of the circuit controller shaft to the torque adjusting end of the detector plate shaft, or to either or both ends of the torque rod may equally be made in this embodiment of our invention.

A feature of the embodiment described above is the resilient mounting provided for the bearing supports 88, 88a. The two resilient pads 104, 105 provided for each of the bearing support pads 97 absorb the shock caused by the pounding of a passing train, the shock being transmitted through the rails and ties to the supporting straps 101, 101a. The weight of a train on the rails and ties will also tend to twist and shift the ties, a condition which is aggravated where poor ballast conditions exist. The resilient pads 104, 105 will tend to absorb these forces, the bearing supports 88, 88a thereby remaining in alignment with each other.

Another feature of the latter embodiment is the use of the shims 103 in the resilient mountings of the bearing supports. As previously described, the opposing faces of the two railway ties are not always parallel throughout their entire lengths. The mounting of the bearing supports on the supporting straps which do not lie in the same plane, may result in a misalignment of the torque rod lugs 21 with the fixed stops 92, 93, or the torque disc lugs 119 with the fixed stops 92a, 93a. By increasing or decreasing the number of shims 103 in any given mounting for the bearing supports, the bearing support stops may be properly aligned with the corresponding torque rod lugs so that no lost motion between the parts will exist.

In the several embodiments illustrated in the accompanying drawings and hereinabove described, it will be appreciated that the parts are readily interchangeable so that the circuit controller housings may be fastened to either one of the bearing supports, and the circuit controller shaft coupled to either end of the detector plate shaft or to either end of the torque rod. The bearing support cover castings provided may also be fixed to either of the bearing supports. The circuit controller may thus be on either the left-hand or right-hand side of the tracks, as circumstances and conditions in the field may warrant. Thus a dragging equipment detector embodying our invention may be readily installed in a trackway, and the contacts of the circuit controller readily integrated into an existing signal system, or used to control a special restrictive signal.

Although we have herein shown and described several forms of dragging equipment detectors embodying our invention, it is understood that various changes and modifications may be made therein within the scope of the appended claims without departing from the spirit and scope of our invention.

Having thus described our invention, what we claim is:

1. In a dragging equipment detector, the combination comprising a tubular member, supporting means for pivotally mounting said member transversely of a path of vehicular travel, detector plates fixed to said tubular member, a biasing member substantially coextensive with and within said tubular member, limit stops on said supporting means, and means on said biasing member cooperating with said tubular member and said limit stops to maintain said detector plates in a normal position in which an object dragging from a passing vehicle traversing said path will engage said plates and angularly displace said plates from their normal position, the angular displacement of said detector plates increasing the bias of said biasing member for returning said plates to their normal position after being engaged by the dragging object.

2. A dragging equipment detector comprising a tubular member, supporting means for pivotally mounting said member transversely of a path of vehicular travel, detector plates fixed to said tubular member, a biasing member substantially coextensive with and within said tubular member, limit stops on said supporting means, means on said biasing member cooperating with said tubular member and said limit stops to maintain said detector plates in a normal position in which an object dragging from a passing vehicle traversing said path will engage said plates and angularly displace said plates from their normal position, the angular displacement of said detector plates increasing the bias of said biasing member for returning said plates to their normal position after being engaged by the dragging object, and a circuit controller actuated upon angular displacement of said tubular member.

3. In a dragging equipment detector, the combination comprising a tubular member, supporting means for pivotally mounting said member transversely of a path of vehicular travel, detector plates fixed to said member, a torque member substantially coextensive with and within said tubular member, radially extending lugs on said torque member, extensions on said tubular member cooperating with said lugs, stops on said supporting means cooperating with said lugs, and means cooperating with one end of said torque member for initially biasing said member to maintain said detector plates in a normal position determined by the supporting means stops and in which an object dragging from a passing vehicle traversing said path will engage said plates and angularly displace said plates from their normal position, the angular displacement of said plates rotating said tubular member to increase the bias of said torque member by the engagement of the tubular member extensions with the radial lugs of said torque member.

4. A dragging equipment detector comprising a tubular member, supporting means for pivotally mounting said member transversely of a path of vehicular travel, detector plates fixed to said member, a torque member substantially coextensive with and within said tubular member, radially extending lugs on said torque member, extensions on said tubular member cooperating with said lugs, stops on said supporting means cooperating with said lugs, means cooperating with one end of said torque member for initially biasing said member to maintain said detector plates in a normal position determined by the supporting means stops and in which an object dragging from a passing vehicle traversing said path will engage said plates and angularly displace said plates from their normal position, the angular displacement of said plates rotating said tubular member to increase the bias on said torque member by the engagement of the tubular member extensions with the radial lugs of said torque member, and a circuit controller actuated upon rotation of said tubular member.

5. In a dragging equipment detector, the combination comprising a tubular member, supports for each end of said member for pivotally mounting said member transversely of a path of vehicular travel, detector plates fixed to said member, a torsion member substantially coextensive with and within said tubular member, at least one radially extending lug on each end of said torque member, at least one extension on each end of said tubular member cooperating with the lug on the corresponding end of the torque member, and at least one stop in each of said supports cooperating with the torque member lugs, said lugs, extensions and stops cooperating to maintain said detector plates in a normal position determined by said stops and in which an object dragging from a passing vehicle traversing said path will engage said plates and angularly displace said plates from their normal position, the angular displacement of said tubular member by said plates torsionally deflecting one end of said torsion member for biasing said plates to their normal position after actuation by the dragging object.

6. A dragging equipment detector comprising a tubular member, supports for each end of said member for pivotally mounting said member transversely of a path of vehicular travel, detector plates fixed to said member, a torsion member substantially coextensive with and within said tubular member, at least one radially extending lug on each end of said torque member, at least one extension on each end of said tubular member cooperating with the lug on the corresponding end of the torque member, at least one stop in each of said supports cooperating with the torque member lugs, said lugs, extensions and stops cooperating to maintain said detector plates in a normal position determined by said stops and in which an object dragging from a passing vehicle traversing said path will engage said plates and angularly displace said plates from their normal position, the angular displacement of said tubular member by said plates torsionally deflecting one end of said torsion member for biasing said plates to their normal position after actuation by the dragging object, and a circuit controller actuated upon angular displacement of said tubular member.

7. A dragging equipment detector comprising a tubular member, supports for each end of said member for pivotally mounting said member transversely of a path of vehicular travel, detector plates fixed to said member, a torsion member substantially coextensive with and within said tubular member, at least one radially extending lug on each end of said torque member, at least one extension on each end of said tubular member cooperating with the lug on the corresponding end of the torque member, at least one stop in each of said supports cooperating with the torque member lugs, said lugs, extensions, and stops cooperating to maintain said detector plates in a normal position determined by said stops and in which an object dragging from a passing vehicle traversing said path will engage said plates and angularly displace said plates from their normal position, the angular displacement of said tubular member by said plates torsionally deflecting one end of said torsion member for biasing said plates to their normal position after actuation by the dragging object, and a circuit controller coupled to one end of said torsion member and actuated by the torsional deflection of that end of the torsion member.

8. In a dragging equipment detector, the combination comprising torque bar means extending transversely of a path of vehicular travel, said means including a pivotally mounted member; detector plates on said member and maintained by said torque bar means in a normal position in which said plates may be engaged by an object dragging from a passing vehicle and angularly displaced, cooperating abutment means for the ends of said torque bar means and said member for selective engagement upon angular displacement of said plates for torsionally deflecting one end or the other of said torque bar means determined by the direction of travel of the vehicle past said means.

9. A dragging equipment detector comprising torque bar means extending transversely of a path of vehicular travel, said means including a pivotally mounted member; detector plates on said member and maintained by said torque bar means in a normal position in which said plates may be engaged by an object dragging from a passing vehicle traversing said path and angularly displaced from their normal position, cooperating abutment means for the ends of said torque bar means and said member for selective engagement upon angular displacement of said plates for torsionally deflecting one end of said torque bar means determined by the direction of travel of the vehicle past said means, and a circuit controller coupled to an end of said torque bar means and actuated by the torsional deflection of that end of the torque bar means.

10. In a dragging equipment detector, the combination comprising a tubular member, bearing supports for each end of said member for pivotally supporting said member transversely of a path of vehicular travel, detector plates fixed to said member, a torque rod substantially coextensive with and within said member, at least one radially extending lug on each end of said torque rod, at least one extension on each end of said tubular member cooperating with the lugs on the corresponding ends of the torque rod so that rotation of the tubular member in one direction will tend to rotate one end of said torque rod and rotation of the tubular member in the other direction will tend to rotate the second end of said torque rod, and limit stops for each of said bearing supports cooperating with the radially extending lugs of said torque rod so that the second end of said torque rod is held against rotation upon rotation of said tubular member in the first direction and the first end of said torque rod is held upon rotation of the tubular member in the second direction.

11. In a dragging equipment detector, the combination comprising a tubular member, bearing supports for each end of said member for pivotally supporting said member transversely of a path of vehicular travel, detector plates fixed to said member, a torque rod substantially coextensive with and within said member, at least one radially extending lug on each end of said torque rod, at least one extension on each end of said tubular member cooperating with the lugs on the corresponding ends of the torque rod so that rotation of the tubular member in one direction will tend to rotate one end of said torque rod and rotation of the tubular member in the other direction will tend to rotate the second end of said torque rod, limit stops for each of said bearing supports cooperating with the radially extending lugs of said torque rod so that the second end of said torque rod is held against rotation upon rotation of said tubular member in the first direction and the first end of said torque rod is held upon rotation of the tubular member in the second direction, and torque adjustment means on one end of said torque rod for torsional deflecting said torque rod to bias said plates to a normal position determined by said limit stops and in which an object dragging from a passing vehicle traversing said path will engage said plates and angularly displace the same in the direction of travel of the passing vehicle to rotate said tubular member, the increased torsional deflection of said torque rod biasing said plates to their normal position after angular displacement by the dragging object.

12. In a dragging equipment detector, the combination comprising a tubular member, bearing supports for each end of said member for pivotally supporting said member transversely of a path of vehicular travel, detector plates fixed to said member, a torque rod substantially coextensive with and within said member, at least one radially extending lug on each end of said torque rod, at least one extension on each end of said tubular member cooperating with the lugs on the corresponding ends of the torque rod so that rotation of the tubular member in one direction will tend to rotate one end of said torque rod and rotation of the tubular member in the other direction will tend to rotate the second end of said torque rod, adjustable limit stops for each of said bearing supports cooperating with the radially extending lugs of said torque rod so that the second end of said torque rod is held against rotation upon rotation of said tubular member in the first direction and the first end of said torque rod is held upon rotation of the tubular member in the second direction, said limit stops determining the normal position of the detector plates in which said detector plates may be engaged by an object dragging from a passing vehicle traversing said path, and means for aligning said limit stops with their respective corresponding lugs.

13. A dragging equipment detector comprising a tubular member, bearing supports for each end of said member for pivotally supporting said member transversely of a path of vehicular travel, detector plates fixed to said member, a torque rod substantially coextensive with and within said member, at least one radially extending lug on each end of said torque rod, at least one extension on each end of said tubular member cooperating with the lugs on the corresponding ends of the torque rod so that rotation of the tubular member in one direction will tend to rotate one end of said torque rod and rotation of the tubular member in the other direction will tend to rotate the second end of said torque rod, limit stops for each of said bearing supports cooperating with the radially extending lugs of said torque rod so that the second end of said torque rod is held against rotation upon rotation of said tubular member in the first direction and the first end of said torque rod is held upon rotation of the tubular member in the second direction, torque adjustment means on one end of said torque rod for torsionally deflecting said torque rod to bias said plates to a normal position determined by said limit stops and in which an object dragging from a passing vehicle traversing said path will engage said plates and angularly displace the same in the direction of travel of the passing vehicle to rotate said tubular member, the increased torsional deflection of said torque rod biasing said plates to their normal position after angular displacement by the dragging object, and a circuit controller coupled to an end of said tubular member and actuated by the rotation of said tubular member.

14. A dragging equipment detector comprising a tubular member, bearing supports for each end of said member for pivotally supporting said member transversely of a path of vehicular travel, detector plates fixed to said member, a torque rod substantially coextensive with and within said member, at least one radially extending lug on each end of said torque rod, at least one extension on each end of said tubular member cooperating with the lugs on the corresponding ends of the torque rod so that rotation of the tubular member in one direction will tend to rotate one end of said torque rod and rotation of the tubular member in the other direction will tend to rotate the second end of said torque rod, limit stops for each of said bearing supports cooperating with the radially extending lugs of said torque rod so that the second end of said torque rod is held against rotation upon rotation of said tubular member in the first direction and the first end of said torque rod is held upon rotation of the tubular member in the second direction, torque adjustment means on one end of said torque rod for torsionally deflecting said torque rod to bias said plates to a normal position determined by said limit stops and in which an object dragging from a passing vehicle traversing said path will engage said plates and angularly displace the same in the direction of travel of the passing vehicle to rotate said tubular member, the increased torsional deflection of said torque rod biasing said plates to their normal position after angular displacement by the dragging object, and a circuit controller coupled to an end of said torque rod and actuated by the rotation of that end of the torque rod.

15. A dragging equipment detector comprising a tubular member, bearing supports for each end of said member for pivotally supporting said member transversely of a path of vehicular travel, detector plates fixed to said member, a torque rod substantially coextensive with and within said member, at least one radially extending lug on each end of said torque rod, at least one extension on each end of said tubular member cooperating with the lugs on the corresponding ends of the torque rod so that rotation of the tubular member in one direction will tend to rotate one end of said torque rod and rotation of the tubular member in the other direction will tend to rotate the second end of said torque rod, limit stops for each of said bearing supports cooperating with the radially extending lugs of said torque rod so that the second end of said torque rod is held against rotation upon rotation of said tubular member in the first direction and the first end of said torque rod is held upon rotation of the tubular member in the second direction, torque adjustment means on one end of said torque rod for torsionally deflecting said torque rod to bias said plates to a normal position determined by said limit stops and in which an object dragging from a passing vehicle traversing said path will engage said plates and angularly displace the same in the direction of travel of the passing vehicle to rotate said tubular member, the increased torsional deflection of said torque rod biasing said plates to their normal position after angular displacement by the dragging object, and a circuit controller coupled to an end of said tubular member and actuated by the rotation of said tubular member in a predetermined direction.

16. A dragging equipment detector comprising a tubular member, bearing supports for each end of said member for pivotally supporting said member transversely of a path of vehicular travel, detector plates fixed to said member adapted to be engaged by an object dragging from a passing vehicle and angularly displaced from a normal position, a torque rod substantially coextensive with and within said member, at least one radially extending lug on each end of said torque rod, at least one extension on each end of said tubular member cooperating with the lugs on the corresponding ends of the torque rod so that rotation of the tubular member in one direction will tend to rotate one end of said torque rod and rotation of the tubular member in the other direction will tend to rotate the second end of said torque rod, limit stops for each of said bearing supports cooperating with the radially extending lugs of said torque rod so that the second end of said torque rod is held against rotation upon rotation of said tubular member in the first direction and the first end of said torque rod is held upon rotation of the tubular member in the second direction, at least one limit stop for one of said bearing supports cooperating with the lug on that end of the torque rod, a housing adjustably mounted on the other of said bearing supports, at least one limit stop within said housing cooperating with the lug on the second end of the torque rod, said limit stops holding their corresponding ends of the torque rod against predetermined directions of rotation thereof by said tubular member, means for adjusting the mounting of said housing on said support to align the limit stops with said torque rod lugs, and a circuit controller within said housing actuated upon the angular displacement of said detector plates by a dragging object.

17. In a two part housing forming an enclosure for a rotatable member adapted to be rotated between predetermined limits defined by at least one limit stop coperating with the rotatable member, the limit stop being fixed to one part of the housing, the fastening means for the two parts of the housing comprising, bolt openings in one part of said housing angularly disposed with reference to the axis of rotation of said rotatable member, elongated slots in the other part of said housing in alignment with said bolt openings and similarly disposed with respect to the axis of rotation of the rotatable member, bolts passing through the bolt openings and the corresponding elongated slots in both parts of said housing, and nuts for fastening the two parts of the housing together with the limit stop in a predetermined position.

18. In a two part housing forming an enclosure for a rotatable member adapted to be rotated between predetermined limits defined by at least one limit stop cooperating with the rotatable member, the limit stop being fixed to one part of the housing, the fastening means for the two parts of the housing comprising, a tongue and groove connection between the two parts of the housing, bolt openings in one part of said housing angularly disposed with reference to the axis of rotation of said rotatable member, elongated slots in the other part of said housing in alignment with said bolt openings and similarly disposed with respect to the axis of rotation of the rotatable member, bolts passing through the bolt openings and the corresponding elongated slots in both parts of said housing, and nuts for fastening the two parts of the housing together with the limit stop in a predetermined position.

19. In combination with a member extending transversely of a railway track in such manner that an object dragging from a passing vehicle will engage said member, supports fixed to the opposing faces of two railway ties for mounting said member so that said member is free to move a limited degree in either direction from a normal position when engaged by the dragging object, and a circuit controller fixed to one of said supports and actuated by the movement of said member, said supports and said circuit controller being below the top surfaces of the railway ties.

20. In combination with a member extending transversely of a railway track in such manner that an object dragging from a passing vehicle will engage said member, supports fixed to the opposing faces of two railway ties for mounting said member so that said member is free to move a limited degree in either direction from a normal position when engaged by the dragging object, biasing means substantially coextensive with said member for maintaining said member in its normal position, movement of said member increasing the bias of said means for returning the member to its normal position after engagement by a dragging object, and a circuit controller fixed to one of said supports and actuated by the movement of said member, said supports and said circuit controller being below the top surfaces of the railway ties.

21. A dragging equipment detector for a railroad, comprising a member, supports fixed to opposing faces of two railway ties for pivotally mounting said member transversely of a railway track, detector plates fixed to said member, biasing means for said member to position said detector plates in an intermediate position in which objects dragging from a passing vehicle will strike said detector plates and angularly displace said plates in either direction depending upon the direction of travel of the passing vehicle, and a circuit controller fixed to one of said supports and actuated by the angular displacement of said plates, said member, supports and circuit controller being below the top surfaces of the railway ties.

22. In a dragging equipment detector, the combination of a tubular member, supporting means for the ends of said member for pivotally mounting said member transversely of a path of vehicular travel, detector plates fixed to said tubular member, a biasing member substantially coextensive with and within said tubular member, limit stops on said supporting means, a torque arm fixed to one end of said biasing member and adapted to engage the limit stop of the supporting means for the corresponding end of the tubular member, a stop member at the second end of said biasing member adapted to engage the limit stop of the supporting means for the second end of said tubular member, and a torque member fixed to the second end of said biasing member in juxtaposition with said stop member and movable with respect thereto for torsionally deflecting said biasing member, said torque member being fixed in a torsional deflecting position to said stop member, the torsional deflection of said biasing member maintaining said detector plates in an initial position determined by said limit stops.

23. In a dragging equipment detector, the combination of a tubular member provided at one end with extending lugs, supporting means for the ends of said member for pivotally mounting said member transversely to a path of vehicular travel, detector plates fixed to said tubular member, a biasing member substantially coextensive with and within said member for maintaining said detector plates in an intermediate position in which an object dragging from a passing vehicle will strike and deflect said plates, a circuit controller fixed to one of said supporting means and having a shaft and circuit making elements operated by the rotation of the circuit controller shaft, said circuit controller shaft having a recessed member cooperating with the extending lugs of said tubular member whereby said circuit controller shaft is rotated upon deflection of said detector plates.

24. A dragging equipment detector comprising a tubular member pivotally supported transversely of a railway track, detector plates fixed to said tubular member, biasing means within said tubular member, and cooperating abutment members on said biasing means and said member forming a means for interconnecting said tubular member and said biasing means whereby said biasing means positions said tubular member and said detector plates in an intermediate position in which objects dragging from a passing vehicle will strike the detector plates and angularly displace said plates from said intermediate position in either direction depending upon the direction of travel of the passing vehicle.

25. A dragging equipment detector comprising a tubular member pivotally supported transversely of a railway track, detector plates fixed to said tubular member, biasing means substantially coextensive with and within said tubular member, and cooperating abutment members on said biasing means and said member forming a means for interconnecting the ends of said tubular member and said biasing means whereby said biasing means positions said tubular member in an intermediate position in which objects dragging from a passing vehicle will strike the detector plates and angularly displace said plates from said intermediate position in either direction depending upon the direction of travel of the passing vehicle.

KENNETH J. J. McGOWAN.
ROBERT A. WOODS.

References Cited in the file of this patent

UNITED STATES PATENTS

| Number | Name | Date |
|---|---|---|
| 209,215 | Bastet | Oct. 22, 1878 |
| 829,466 | Gilbert | Aug. 28, 1906 |
| 995,748 | Whiteman | June 20, 1911 |
| 1,086,013 | Beacom | Feb. 13, 1914 |
| 1,691,697 | Bommer | Nov. 13, 1928 |
| 2,046,157 | Gibbs | June 30, 1936 |
| 2,095,616 | Post | Oct. 12, 1937 |
| 2,146,341 | Kahn | Feb. 7, 1939 |
| 2,580,760 | Goodwin | Jan. 1, 1952 |